(12) United States Patent
Wang

(10) Patent No.: US 10,783,188 B2
(45) Date of Patent: Sep. 22, 2020

(54) INTELLIGENT EMBEDDED SELF-HELP SERVICE

(71) Applicant: salesforce.com, inc., San Francisco, CA (US)

(72) Inventor: Xin Wang, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 678 days.

(21) Appl. No.: 15/436,581

(22) Filed: Feb. 17, 2017

(65) Prior Publication Data

US 2018/0239837 A1    Aug. 23, 2018

(51) Int. Cl.
| | | |
|---|---|---|
| *G06F 7/00* | (2006.01) | |
| *G06F 17/00* | (2019.01) | |
| *G06F 16/903* | (2019.01) | |
| *G06Q 10/10* | (2012.01) | |
| *G06F 16/17* | (2019.01) | |

(52) U.S. Cl.
CPC ........ *G06F 16/90335* (2019.01); *G06F 16/17* (2019.01); *G06Q 10/1095* (2013.01)

(58) Field of Classification Search
CPC .............. G06F 16/90335; G06F 16/17; G06Q 10/1095
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Tuan A Pham
(74) *Attorney, Agent, or Firm* — Weaver Austin Villeneuve & Sampson LLP

(57) ABSTRACT

Disclosed are examples of systems, apparatus, methods, and computer program products for providing an embedded self-help service for e-commerce applications. A number of enterprise records are maintained within a database. First input data is then processed from a user device connected to an e-commerce environment. The first input data indicates that a user requests assistance from an e-commerce provider associated with the e-commerce environment. A conversational widget is initiated, configurable for display on the user device and embedded within the e-commerce environment. A first request for the user device to provide second input data is processed, as well as the second input data. A user intent for disambiguation of the second input data is then determined in associated with the enterprise records, and a user-actionable application module is initiated corresponding to the user intent, configurable for display on the user device and embedded within the conversational widget.

20 Claims, 13 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |

(56) References Cited

U.S. PATENT DOCUMENTS

| | | |
|---|---|---|
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0268468 A1* | 10/2013 | Vijayaraghavan ..... G06Q 30/02 706/12 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0332385 A1* | 11/2015 | Hogg ..................... G06Q 30/06 705/26.81 |
| 2016/0284011 A1* | 9/2016 | Dong ................. G06Q 30/0631 |

\* cited by examiner

INTELLIGENT EMBEDDED SELF-HELP SERVICE

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to e-commerce, and more specifically to providing an embedded self-help service for e-commerce applications.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for providing an embedded self-help service for e-commerce applications. These drawings in no way limit any changes in form and detail that may be made by one skilled in the art without departing from the spirit and scope of the disclosed implementations.

DETAILED DESCRIPTION

Figure 1:
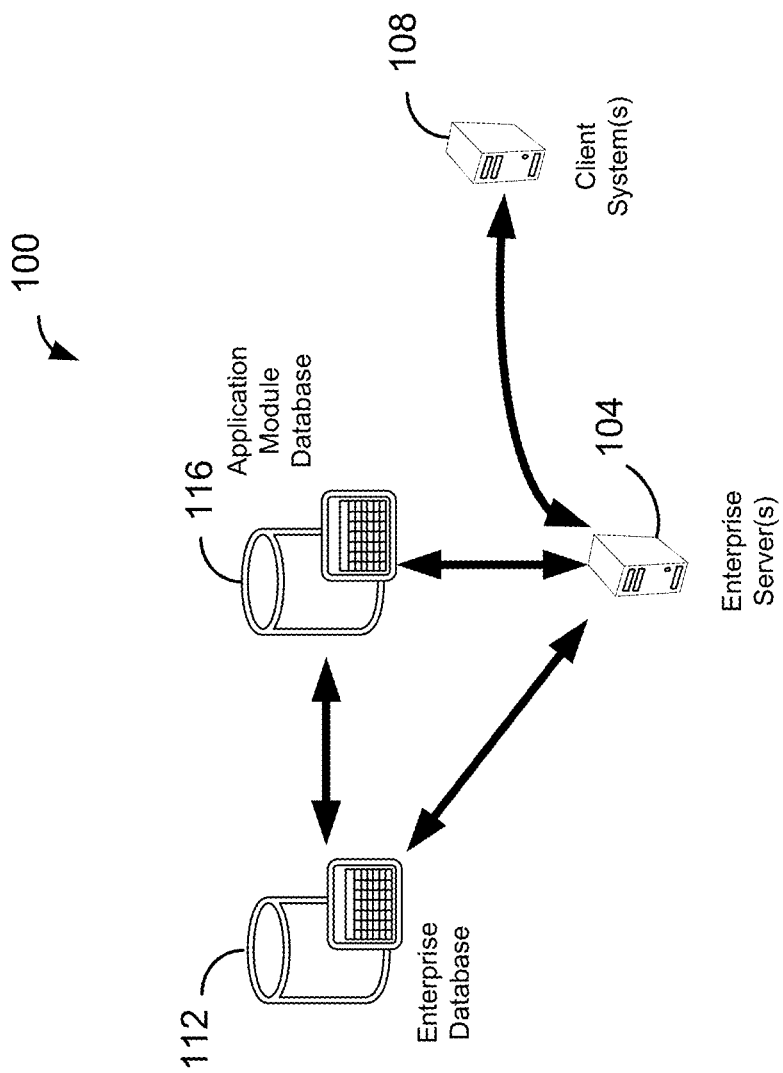
FIG. 1 shows a system diagram of an example of a system 100 for providing an embedded self-help service for e-commerce applications, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing an embedded self-help service for e-commerce applications.

An important aspect of e-commerce today is customer service and support. During the e-commerce experience, a customer navigating through an e-commerce website or application may browse through products and services that suit their needs. During this process, the customer may run into confusion or difficulty in a number of ways. A product the customer may be looking for may be difficult to find or not present, or details about a product may not be answered to the customer's satisfaction. A customer may also have questions about products or services he or she has purchased. When this has occurred in commerce situations, traditionally the company may provide a customer service agent who can answer questions and provide support.

In e-commerce, often it can save the customer's time and the e-commerce provider's resources to provide self-help support services in various ways. A customer may navigate to or be presented with an article that answers the customer's questions, for example, or may be directed to a forum where common questions and answers are found. While this may potentially lead to a quick resolution for the customer, the customer often must nevertheless supply some willingness and ability to navigate towards a solution independently in search of his answer. In addition, such navigation around self-help services often leads the customer away from the particular product pages and searches that the customer was in the process of during his e-commerce session. There is also a risk of losing context when the self-service experience is separated from the product itself.

By way of illustration, Acme is a computer reseller with an e-commerce website containing a self-help service experience. A customer, Cathy, browses through the e-commerce website, looking at deals on laptops and customization options for hard drive size, memory, and other aspects of the purchase. Since the options and explanations don't address some particular questions Cathy has, she clicks on a Help link at the top right corner of the e-commerce page. The link takes her to a separate part of the website, where she navigates through multiple screens of the self-help service, searching for answers to her questions. Dissatisfied and unable to find the answer, she navigates to the "Contact Us" section of the site, where a phone number to speak with a customer service agent is listed. Cathy calls the number and is put on hold for several minutes. Feeling frustrated, she hangs up and attempts to continue her product browsing, but she doesn't remember which laptop products and customization options she was looking at. Rather than spend more time on the e-commerce website, she gives up and navigates to a different site rather than completing a purchase.

Some of the disclosed techniques can be implemented to provide for an embedded self-help service with conversational widget for e-commerce applications. A number of enterprise records are maintained with a database. A user connected to an e-commerce environment through a user device inputs some data indicating that the user requests assistance. This data is processed, and a conversational widget is initiated and displayed on the user device. In some implementations, the conversational widget is embedded within the e-commerce environment, such as being overlaid on top of the e-commerce pages the user had navigated to prior to requesting assistance, or being contained in a section adjacent to those e-commerce pages. A request for a user intent is sent to the user device, such as a request for the user to explain what he would like assistance with. The user provides input data responding to this request, and a user intent is determining from the input data in association with one or more of the enterprise records maintained in the database. The user intent disambiguates the second input data, providing insight into what the user had intended when seeking help. A user-actionable application module is initiated corresponding to this user intent. The application module is embedded within the conversational widget and provides further support for the user's needs in response to the user intent.

Applying some implementations of the disclosed techniques, an alternative scenario to that described above is provided. In this alternative scenario, Acme once again has an e-commerce website with self-help service. This time, however, the self-help service functions differently. Cathy, confused while choosing customization options for a laptop, navigates to a "Help" link at the top right corner of the site. A chat window is presented on the screen, adjacent to the still-accessible product page for the laptop customization options. In addition, an option is presented to Cathy to communicate through a mobile phone app or text message app. On the chat window, an automated chat bot asks Cathy what she would like help with. She replies that she wants to learn more about what different types of memory are available for customization of the laptop, and what the differences between the options are. In response, the chat bot offers an article presenting the different options. The chat bot asks Cathy if that answered her question. She says that she would still like an explanation of the differences. The chat bot is not designed to parse this more sophisticated user intent, and thus moves to contacting a user agent to help Cathy. Cathy is connected with Alex, a customer service agent who talks to Cathy through the same chat window. Alex is able to point to different products on the product page that Cathy is still able to view and access. Finally, Cathy schedules an appointment for an in-person demonstration of the laptop products, right within the chat window. She then thanks Alex, and concludes the chat. As a final interaction, Cathy is prompted to provide a rating of how satisfied she is within the service. Cathy rates the service 5 stars, and the chat window disappears, allowing Cathy to continue her e-commerce experience from the laptop product page, still viewing and accessible throughout the entire self-help experience.

In this way, the chat bot disambiguates the customer's input to establish the user intent, and responds accordingly with one of several application modules, including a knowledge base to provide articles, connecting the user to a live agent, scheduling appointments, opening a support ticket, providing customer service ratings, and more. Individual, interactive modules are presented right within the chat window or widget. Customer and enterprise data, including product, customer account, and marketing data, can be leveraged during this self-help experience. When the customer is finished, the conversational widget closes and the customer is placed back in the same place where he was within the existing e-commerce session.

In some but not all implementations, the disclosed methods, apparatus, systems, and computer-readable storage media may be configured or designed for use in a multi-tenant database environment or system.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for providing an embedded self-help service for e-commerce applications, in accordance with some implementations. System 100 includes a variety of different hardware and/or software components which are in communication with each other. In the non-limiting example of FIG. 1, system 100 includes at least one enterprise server 104, at least one client system 108, at least one enterprise database 112, and at least one application module database 116.

Enterprise database 112 can allow for storage and retrieval of enterprise or customer relationship management records within an e-commerce environment. In some implementations, records may be retrieved from a remote server and stored in the enterprise database 112. In some implementations, records in the enterprise database 112 may include customer account data, customer intent history, customer e-commerce preferences, product data, and more.

Application module database 116 can allow for storage and retrieval of one or more application modules for use within the e-commerce environment. In some implementations, application modules in the application module database 116 may include chat modules, knowledge base modules, support ticket modules, live agent modules, appointment scheduling modules, service rating modules, and more.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the enterprise database 112 and the application module database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed. In some implementations, multiple client systems 108 may be presented and may work in conjunction, such as through an e-commerce environment being presented on a laptop while a self-help service is presented simultaneously on a mobile phone.

Figure 2:
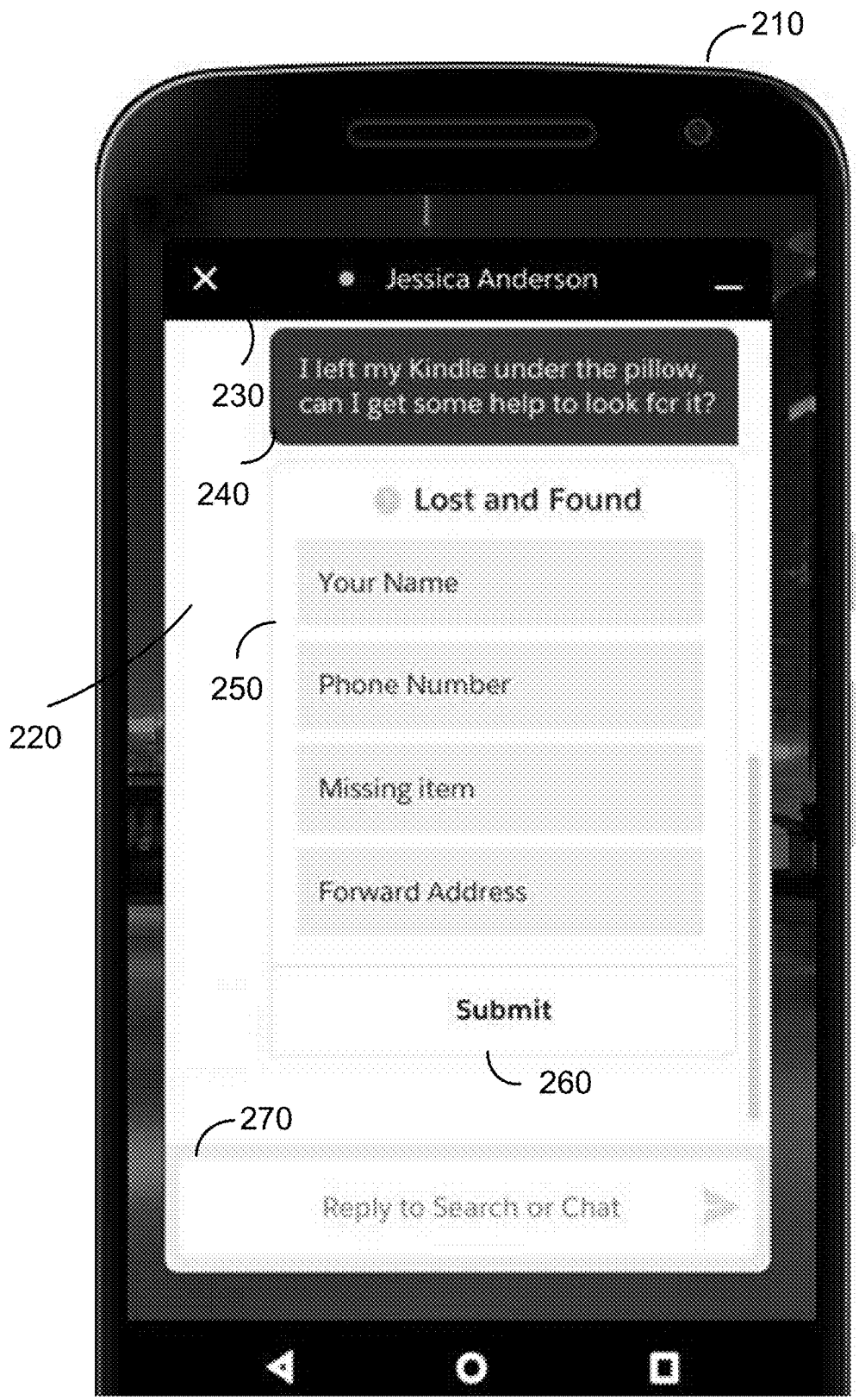
FIG. 2 is an example of an embedded self-help service for e-commerce applications, in accordance with some implementations.

FIG. 2 is an example of an embedded self-help service for e-commerce applications, in accordance with some implementations. User device 210 may be a computing device capable of communicating via one or more data networks with a server. In some implementations, examples of user device 210 may include a desktop computer or a portable electronic device such as a smartphone, tablet, a laptop, a wearable device such as Google Glass®, another optical head-mounted display (OHMD) device, a smart watch, etc. In the implementation illustrated in FIG. 2, user device 210 is a smartphone capable of communicating via one or more data networks with a server.

A chat window 220 is displayed on the user device 210. In some implementations, the chat window 220 may be presented on the user device 210 within an application installed or configurable to be executed on the user device 210. In some implementations, the chat window 220 may be presented within a webpage in a browser. In some implementations, the chat window 220 may be presented within a text message application on a smartphone or mobile device, with the chat taking the form of a text message or SMS.

In some implementations, a name identifier 230 may be presented within a portion of the chat window, displaying the name of the agent or automated chat bot that the user is chatting with in the chat window 220. In some implementations, the name identifier 230 includes a presence indicator showing the state or presence of the agent or chat bot. For example, a green circle may signal to the user that the agent or chat bot is active or present within the chat window; a yellow circle may signal to the user that the agent or chat bot is idle, busy, or away from the chat window; and a red circle may signal that the agent or chat bot has left the chat voluntarily or has been disconnected.

The chat window 220 may contain one or more messages 240 from the user, an agent, and/or a chat bot. In the illustrated example, a user is chatting with a live agent of a hotel the user is either staying at or has stayed at in the past, and has sent a message requesting help in finding a lost or misplaced item.

An application module 250 is presented to the user in response to the user's message. An application module is a user-actionable application or widget embedded within the chat window 220. In the illustrated example, application module 250 is presented as a "Lost and Found" widget, allowing a user to fill in text fields with information including the user's name and phone number, the missing item, and a forward address. In some implementations, the application module may take the form of a message, as in message 240. In some implementations, an e-commerce provider may customize application modules to its preferences, or create new application modules for execution within its self-help services. Submit button 260 is part of the application module 250, and submits the information filled in by the user in the text fields to the e-commerce provider for processing.

Reply box 270 is an area for the user to type in a chat reply or search. As most chat services allow, a reply may be submitted by a user and appear as a message within the chat window, visible to the live agent or capable of being processed by a chat bot.

Figure 3:
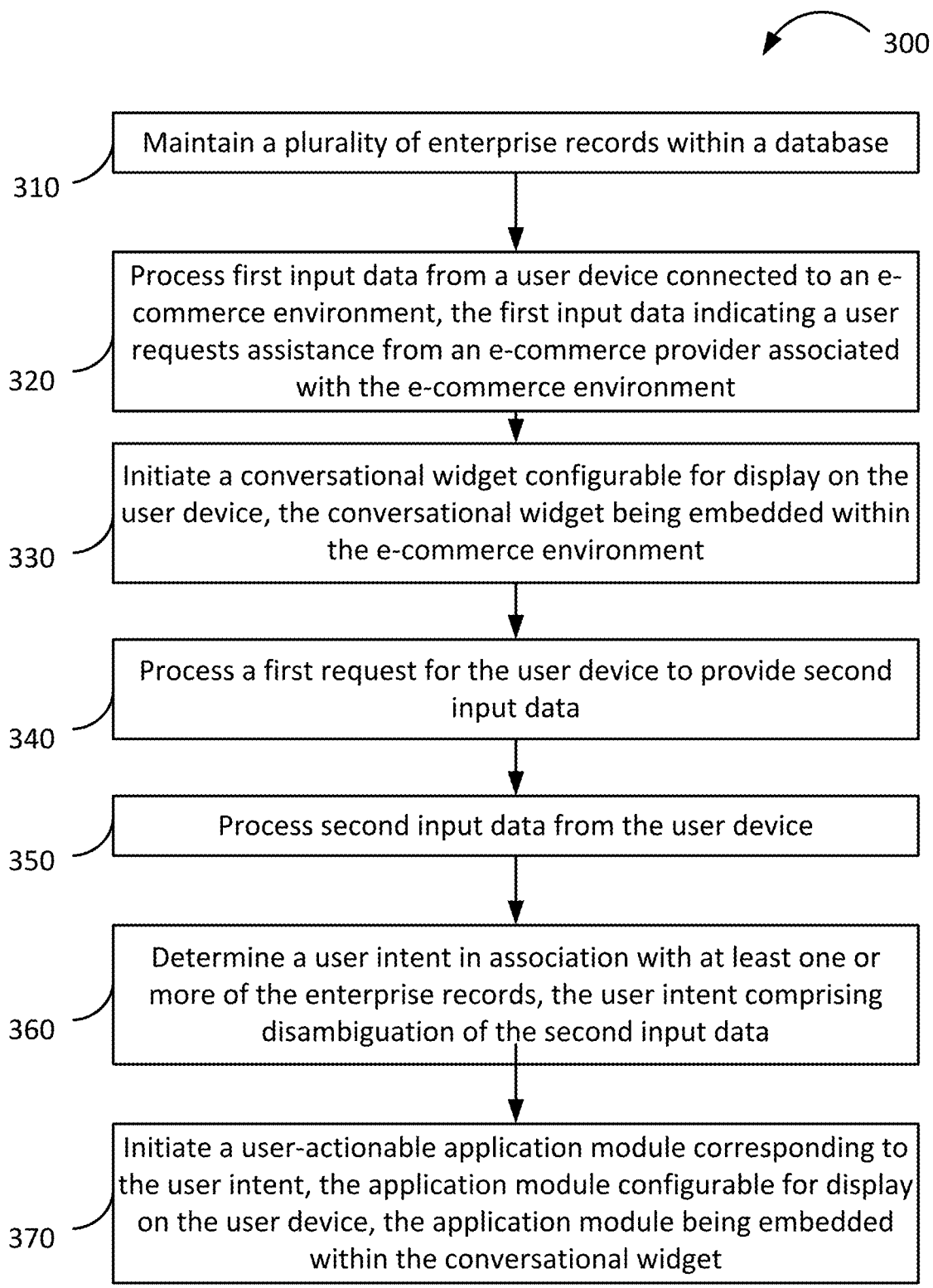
FIG. 3 shows a flowchart of an example of a method 300 for providing an embedded self-help service for e-commerce applications, in accordance with some implementations.

FIG. 3 shows a flowchart of an example of a method 300 for providing an embedded self-help service for e-commerce applications, in accordance with some implementations. Method 300 and other methods described herein may be implemented using system 100 of FIG. 1, although the implementations of such methods are not limited to system 100.

At block 310, system 100 maintains a plurality of enterprise records within enterprise database 112. In some implementations, enterprise database 112 is a multi-tenant database consisting of enterprise records for multiple e-commerce providers. In some implementations, the enterprise records may include any of user account information, live agent information, chat bot information, application information, product information, and self-help service information.

At block 320, system 100 processes first input data from a user device 210 or client system 108 connected to an e-commerce environment. The first input data indicates that a user requests assistance from an e-commerce provider associated with the e-commerce environment. In some implementations, the first input data is a click on a link or button in an e-commerce application or website. For example, a user clicking on a link or button marked as "Help", "Chat", or "Support" may be first input data that is processed by system 100. In some implementations, first input data is data on the user device signaling that a user is opening an application, such as opening a dedicated application from an e-commerce provider. E-commerce provider is an entity or organization that exists within the e-commerce environment as a partial or complete provider or designer of the experience for the user, as well as a partial or complete provider or designer of the self-help service for the user.

At block 330, system 100 initiates a conversational widget configurable for display on the user device. The initiation of the conversational widget may be in response to the processing of the first input data. In some implementations, the conversational widget may be an application, widget, web component, or text message. For example, a user browsing an e-commerce website may see a new chat window open up on the website. In some implementations, the conversational window is embedded directly within the e-commerce environment. For example, a user may be able to view the e-commerce environment with a product page or service page, and also view the conversational widget in a space adjacent to the product page or service, with both visible within a web page or browser window. In some implementations, the conversational widget is configurable for display on the user device such that one or more e-commerce item pages can be displayed simultaneously with the conversational widget on the screen of the user device.

In some implementations, system 100 initiates an automated chat bot within the conversational widget. In some implementations, the automated chat bot may be an artificial intelligence or programmed chat element that carries out a conversation with the user within the chat window or conversational widget. For example, a chat bot may be programmed to greet a user with a standard greeting message prepared by the e-commerce provider, in a manner that mimics a conversation with a live agent. In some implementations, system 100 may determine a chat bot or a conversation flow for a chat bot through a configuration engine. In some implementations, system 100 may select a chat bot for a user based on user information or preferences, or may select from a list of chat bots for different self-help scenarios and contexts.

At block 340, system 100 processes a first request for the user device 210 or client system 108 to provide second input data. In some implementations, the first request is a chat message from the e-commerce live agent or chat bot asking the user what he or she would like assistance with, followed by a wait signal for the user to respond by sending second input data in the form of a chat message. For example, a chat bot may send the message, "Hello! I'll be assisting you today. What do you need help with?"

At block 350, system 100 processes second input data from the user device. In some implementations, second input data is a chat message sent from the user to the e-commerce live agent or chat bot responding to the first request to provide second input data. The second input data may be an answer from the user expressing what assistance the user requires. For example, in response to a chat bot's message asking what the user would like help with, the user may send the chat message reply, "I want to know more about battery options for the product I'm looking at." In some implementations, the second input data may not be required to be a full sentence. For example, the user may simple respond with, "Battery options."

At block 360, system 100 determines a user intent. User intent is the intention of the user in the message that the user sends through the user device as second input data. Determining the user intent allows system 100 to determine which action the user would prefer to be taken which can solve the user's problem or answer the user's question. In some implementations, determining the user intent involves natural language processing, and/or principles related to natural language processing. In some implementations, determining a user intent involves parsing the words and sentences within a message from the user, and giving a weight, score, or ranking for intent possibilities based on the possible meanings parsed from the words and sentences.

System 100 determines the user intent using the processed second input data. For example, if the second input data is a chat message, "Battery options," system 100 may determine that the user may wish to see an article related to battery options for products or for the particular product the user was viewing. Alternatively, system 100 may determine that the user may wish to speak to a live agent.

In some implementations, the user intent may be determined in association with one or more of the enterprise records maintained in enterprise database 112. In some implementations, the enterprise database 112 stores customer account information or customer preferences that help system 100 to determine the user intent. For example, a user may have chosen a preference to have live help from a live agent when asking questions. System 100 will take this preference into account when determining the user intent, and will weigh the option to connect the user with a live agent more highly than other options.

In some implementations, system 100 determines an interaction flow for the conversational widget based on the user intent. The interaction flow provides one or more application modules to be initiated in association with the interaction flow. In some implementations, the interaction flow contains two or more branching paths based on disambiguation of the user intent, the different branching paths corresponding to different possibilities for how the self-help service session should proceed. In some implementations, disambiguation may occur based on different contexts, pieces of user information, enterprise records from enterprise database 112, account or purchase history, pre-determined weightings for words, phrases, or sentences, and many other pieces of data. In some implementations, different branching paths correspond to different application modules being launched for the user. In some implementations, the interaction flow can be customized in whole or in part by an e-commerce provider associated with the e-commerce experience or self-help service. In some implementations, different interaction flows can be chosen from several existing interaction flows. In some implementations, an e-commerce provider can include custom user intents and custom application modules within interaction flows, designed in whole or in part by the e-commerce provider.

In some implementations, the user intent may be determined by calculating one or more confidence weights for one or more potential disambiguations of the second input data. The confidence weights may be scores, rankings, percentages, or other ways of quantifying or measuring the confidence of parsing the input data to be relevant to a given user intent, out of multiple options for user intents. In some implementations, System 100 chooses a disambiguation of the second input data from the potential disambiguations based on the one or more confidence weights. For example, a user may send a chat message to the chat bot during a self-help service session, reading, "I would like someone to explain to me which different memory options for laptops are best for my needs." System 100 calculates different confidence weights for different user intent possibilities in response to this input data. For this example, a user intent of "Knowledge Search" for the user seeking articles relevant to the user's needs may have a confidence weight of 75. A user intent of "Chat" for the user wanting to chat with a live agent may have a confidence weight of 85. System 100 then determines the user intent of "Chat", based on that particular user intent having the highest confidence weight associated with it for the user's input data.

At block 370, system 100 initiates a user-actionable application module corresponding to the user intent. The application module is initiated to be configurable for display on the user device, embedded within the conversational widget. In some implementations, the application module is embedded within the conversational widget, and the conversational widget is embedded within the e-commerce environment. In this way, the application module can function as a widget inside of a widget. In some implementations, system 100 can implement this multi-layered embedding in such a way that widgets can be viewed and interacted with by a user on a user device without the user leaving the e-commerce item page, site, or flow that the user is currently in. The user may feel free to browse articles, chat with a chat bot or live agent, schedule appointments, or otherwise interact with the self-help service without interrupting the e-commerce experience. In some implementations, the user can continue to click through pages in the e-commerce experience or otherwise navigate through the e-commerce environment while simultaneously using or interacting with the conversational widget or application modules within the conversational widget.

Application modules are applications that a user can view and interact with during the self-help service experience. System 100 can be configured to initiate one or more application modules in response to one or more user intents that have been determined from block 360. In some implementations, system 100 selects application modules to be launched from a set of application modules within application module database 116. In some implementations, application modules can be any one of a knowledge base module to present one or more articles for display on the user device, an agent chat module to connect the user device to a live agent, an appointment scheduler module, a web to case module to initiate support tickets and new support cases, a recommendation module to recommend different e-commerce items or act as a shopping assistant for the user, and a rating module for a user to rate the customer service or live agent. For example, if a user intent is determined to be "chat with a live agent", then system 100 can be configured to initiate an application module that connects the user with a live agent, after which the live agent can send messages directly within the conversational widget. As the live agent continues the conversation and determines what the user needs, system 100 can initiate other application modules at the live agent's request, such as an appointment scheduler for scheduling an in-person appointment with a support agent.

In some implementations, upon initiating the user-actionable application module, system 100 may continue to trigger steps and launch additional application modules within the conversational widget. In some implementations, additional input data may be received from the user, and system 100 may determine one or more additional user intents. System 100 may launch one or more additional application modules within the conversational widget.

In some implementations, a user, live agent, or System 100 may determine that the self-help service session is ready to conclude. In some implementations, upon this determination, system 100 may launch a service rating application module, which allows the user to rate the quality of the self-help service or live agent. In some implementations, the user may also leave a comment regarding the self-help service experience or live agent.

Figure 4:
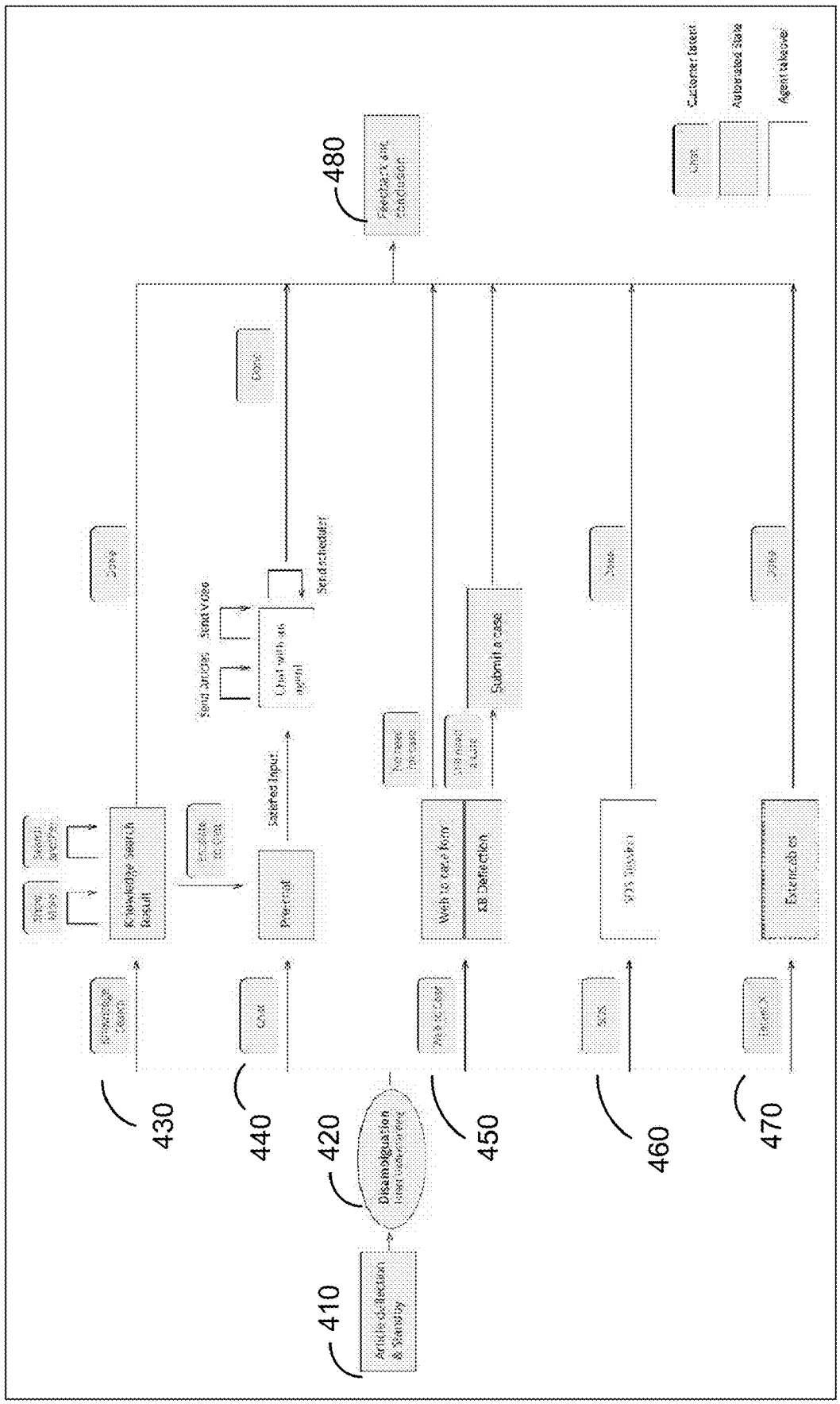
FIG. 4 shows an example of an interaction flow for launching application modules in response to different user intents being determined, in accordance with some implementations.

FIG. 4 shows an example of an interaction flow for launching application modules in response to different user intents being determined, in accordance with some implementations. At block 410, system 100 initially provides a basic article within the conversational widget for general support, and requests the user to provide input on what the user desires assistance with. At block 420, the user has sent input data, and system 100 disambiguates the input data to determine a user intent. Based on the disambiguation, several different paths can be chosen from a list of potential paths within the interaction flow. Example paths include Knowledge Search 430, Chat 440, Web to Case 450, SOS 460, and Intent X 470. Each of these paths will be taken up in turn.

At block 430, the user intent has been determined to be "Knowledge Search". For example, the user may have sent input data such as "I would like to read some reviews about this computer product I'm looking at." System 100 determines the intent and routes the interaction flow to the Knowledge Search path. First, system 100 launches the Knowledge Search application module. In some implementations, this application module is presented and displayed in an embedded form within the conversational widget. System 100 performs a search within an existing knowledge base. In some implementations, the knowledge base may consist of articles, reviews, forum posts, and other documents that the e-commerce provider has stored for support and assistance to users. A knowledge search result that system 100 has determined to be the most relevant to the user's disambiguated request is displayed. In some implementations, a user may view the article or site, scroll through for further content, print or share the article, and otherwise interact with the article. In some implementations, if System 100 determines the user device to be active such that a user is engaging with the self-help service experience, but is idle and not clicking on anything for a period of time while an article is open, then System 100 may determine that the user needs to speak to a live agent, and will initiate a Chat application module to connect the user with a live agent. In some implementations, the user may send a request for the application module to show more search results, or request another search on a different topic. In some situations, the user may request to speak with a live agent, or the automated chat bot may determine that the user is requesting something beyond the knowledge search application module's ability to satisfy. It may then initiate steps within the "Chat" flow at block 440.

At block 440, the user intent has been determined to be "Chat". For example, the user may have sent input data such as "I would like to chat with someone." System 100 determines the intent and routes the interaction flow to the Chat path. First, system 100 launches the Chat application module. The application module begins a pre-chat process, where the user is presented with search fields and asked to enter information such as their name and problem they're having. In some implementations, if applicable, the application module matches the contact case record from the enterprise records at enterprise database 112, and the information is tracked and presented to a live agent, replacing or substituting this information for the pre-chat search field information. Once the user has filled out and submitted the pre-chat information, or the contact case record is match, the chat application module connects the user to a live agent, who is able to send messages directly within the conversational widget. The agent may send chat messages to the user, and the user may also send chat messages and reply.

In some implementations, the live agent may send articles, send video. In some implementations, the live agent may highlight or "draw" on portions of the user's screen to pinpoint links, text, images, or menus of relevance to the user. In some implementations, the live agent may decide to initiate a scheduler application module, to schedule an in-person appointment for the user. The user may interact directly with the scheduler application module, inputting a desired date out of a choice of dates, and a time out of a choice of available time blocks for that date.

At block 450, the user intent has been determined to be "Web to Case". For example, the user may have sent input data such as "I need technical assistance", or "My device is giving an error message when I try to print." System 100 determines the intent and routes the interaction flow to the Web to Case path. First, system 100 launches the "Web to Case" application module. The application module displays a web to case form for the user to view and interact with. The web to case form may display a message such as "Leave us a message and we will get back to you within 24 hours." The form may also include text fields for entering an email address and describing the problem the user is having. The user may submit information through a "Submit" button, or may navigate or cancel the application module in other ways.

Once the user submits information through this form, then the application module determines whether there is a need for a new case or support ticket to be opened. In some implementations, if there is no need for a case, then the application module may display a message before moving to a different part of the interaction flow, or may connect the user to a live agent for further communication. If there is a need for a case, then the application module submits a case based on the information the user submitted in the web to case form.

At block 460, the user intent has been determined to be "SOS", or video chat with a live agent. For example, the user may have sent input data such as "I want to video chat with someone." System 100 determines the intent and routes the interaction flow to the SOS path. System 100 launches the "SOS" application module. The application module then launches the SOS session by connecting the user to a live agent through a video chat embedded within the conversational widget. The user and the live agent can then converse and communicate within the application module. In some implementations, the live agent can point to different portions of the user's screen, or highlight different portions, including text, links, images, menus, and other content within the screen that may assist the user with his needs. After the SOS session is completed and a disconnection is initiated by the user, live agent, or both, then the application module finishes and the conversational widget can resume with other parts of the interaction flow.

At block 470, an "Intent X" is designated to represent a custom user intent that an e-commerce provider can create. In some implementations, an e-commerce provider has the ability to customize part or all of the interaction flow for the self-help service they are building. In some implementations, an e-commerce provider can create one or more custom user intents. Custom user intents are similar to example user intents 430, 440, 450, and 460, but customized specifically an e-commerce provider's needs. For example, a user may communicate the user intent of "find me laptop options between the price ranges of $800 and $1,500." This user intent may not fit into any of the existing user intents, such as a user intent to connect to a live agent, or a user intent to be presented with articles. Thus, in some implementations, as a user intent that has no disambiguations that are determined to be relevant, the user intent by default becomes connecting to a live agent, as a live agent may be able to help with an unusual request. However, an e-commerce provider may create a custom user intent, such as a desire to see specific products within a given price range. In some implementations, the e-commerce provider may include some rules related to the custom user intent, such as providing some input into the natural language analysis for disambiguating a user's input data to mean this custom user intent, or designating certain weights for different words which may trigger the determination of this custom user intent.

In some implementations, system 100 may launch one or more extendables. Extendables may include custom application modules. In some implementations, e-commerce providers may customize part of all of an application module for specific needs within a self-help service. In some implementations, e-commerce providers may create entirely brand new application modules for their needs. For example, an e-commerce provider may create an application module that is designed to list all relevant products within a given price range, based on a user's input data that defines which products the user wants to see and provides a price range. In some implementations, this custom application module may be embedded within the conversational widget, as other application modules can be. In some implementations, the e-commerce provider can program the custom application module to respond to and interact with various user inputs. In some implementations, an e-commerce provider may use a "Flow Builder", "Intent Builder" or "Application Module Builder" environment for designing interaction flows, custom user intents, and custom application modules according to the e-commerce provider's needs. Such custom building environments allow e-commerce providers to design how the self-help service flow will work, and to customize how the disambiguation and parsing of intent for users can be handled, such that users are directed and routed toward certain paths and application modules appropriately.

At block 480, users are given the opportunity to provide feedback for the self-help service before the service's conclusion. In some implementations, system 100 launches a service rating application module. In some implementations, the service rating application module prompts a user to provide a rating for the service or live agent that the user interacted with. For example, the application module may ask the user to rate their experience from 0 to 5 stars. The rating is then sent to the e-commerce provider for further analysis and data on user feedback.

FIGS. 5A, 5B, 5C, 5D, 5E, and 5F illustrate an example conversation within an embedded self-help service for e-commerce applications, in accordance with some implementations.

Figure 5A:
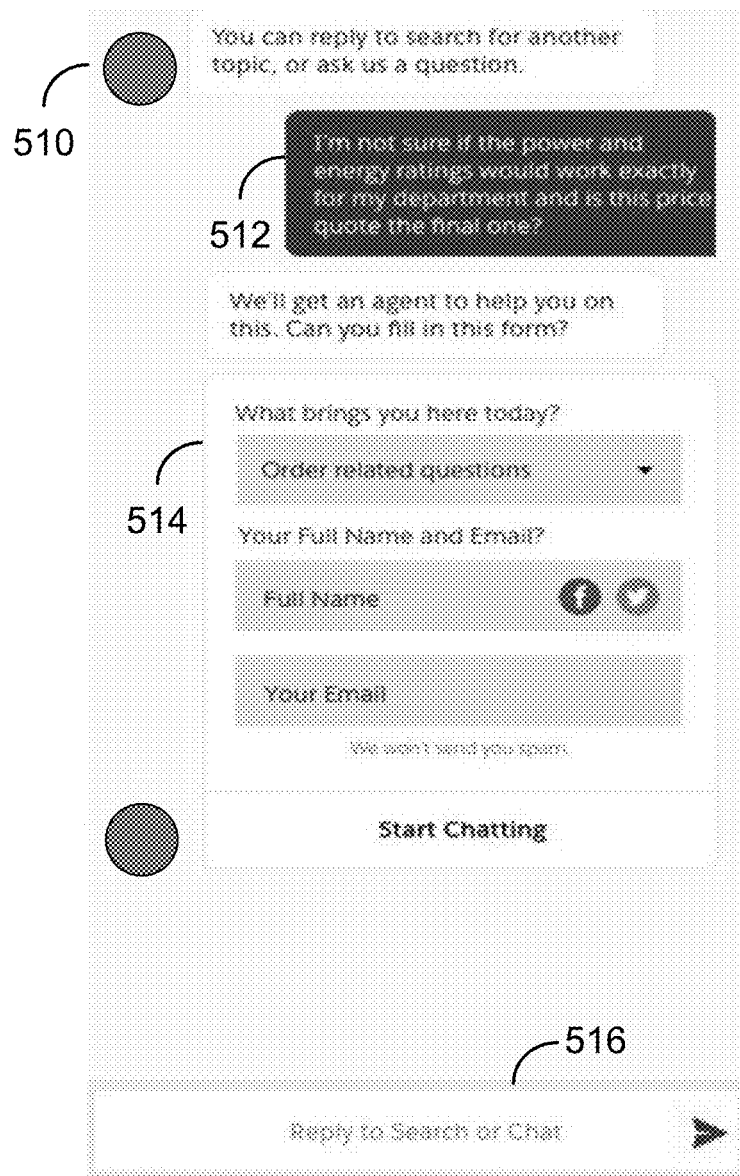
FIG. 5A is an example of a conversation within an embedded self-help service for e-commerce applications, in accordance with some implementations.

FIG. 5A is an example of a conversation within an embedded self-help service for e-commerce applications, in accordance with some implementations. Chat message 510 is a message from an automated chat bot within a conversational widget that is communicating with the user. In this example, the user is currently in a self-help service and has asked one or more questions within the conversational widget in the self-help service. The chat bot sends a message, "You can reply to search for another topic, or ask us a question."

User chat message 512 responds to the chat bot's message with, "I'm not sure if the power and energy ratings would work exactly for my department and is this price quote the final one?" System 100 then determines an intent for this input data. The intent is determined by natural language processing, with different confidence weights given to different possibilities based on the semantic content of the user's input data. In this case, system 100 determines that no disambiguation possibilities are given higher weights than others. Based on this, system 100 concludes that the chat message is too complex for this disambiguation process to properly handle and that a live agent is needed to intervene and assist, or that the user simply needs the help of a live agent rather than an automated process. Within the interaction flow, system 100 thus defaults to the "Chat" path, for connecting the user to a live agent. The chat bot replies, "We'll get an agent to help you on this. Can you fill in this form?" System 100 then launches a chat application module 514 for connecting the user with a live agent. The chat application module 514 is embedded directly within the conversational widget, allowing for ease of access and an interrupted user experience. The chat application module 514 displays a pre-chat form, with text fields and a drop-down menu for user information and a description of the problem. The user can fill in the pre-chat form and click the "Start Chatting" button. The message reply section 516 allows a user to enter a message within the conversational widget by entering text into a text field and clicking on an icon for submitting the message into the conversation.

Figure 5B:
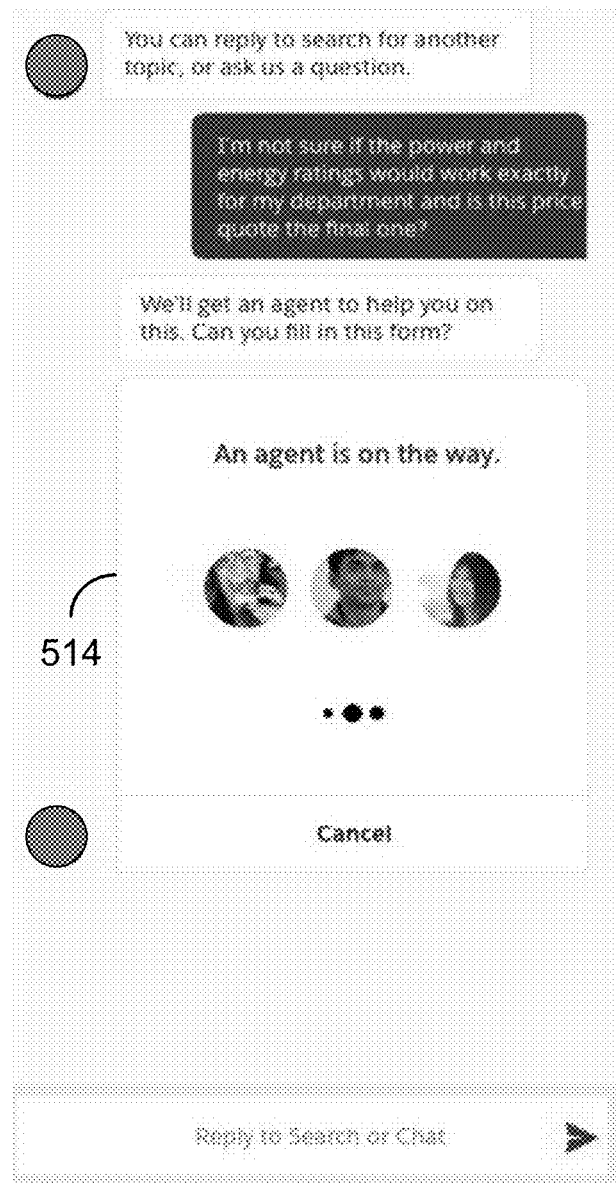
FIG. 5B is a continuation of the example of a conversation within an embedded self-help service for e-commerce applications, in accordance with some implementations.

FIG. 5B is a continuation of the example of a conversation within an embedded self-help service for e-commerce applications, in accordance with some implementations. After the user enters information into the pre-chat form and clicks the "Start Chatting" button, chat application module 514 begins the process of connecting the user with a live agent. The chat application module 514 displays a message, "An agent is on the way", and posts pictures of potential live agents whom the user may connect with, as well as an animation to signal to the user that the chat application module 514 is currently busy processing this task. The user may click a "Cancel" button in the chat application module 514 at any time to cancel the process of connecting to the live agent.

Figure 5C:
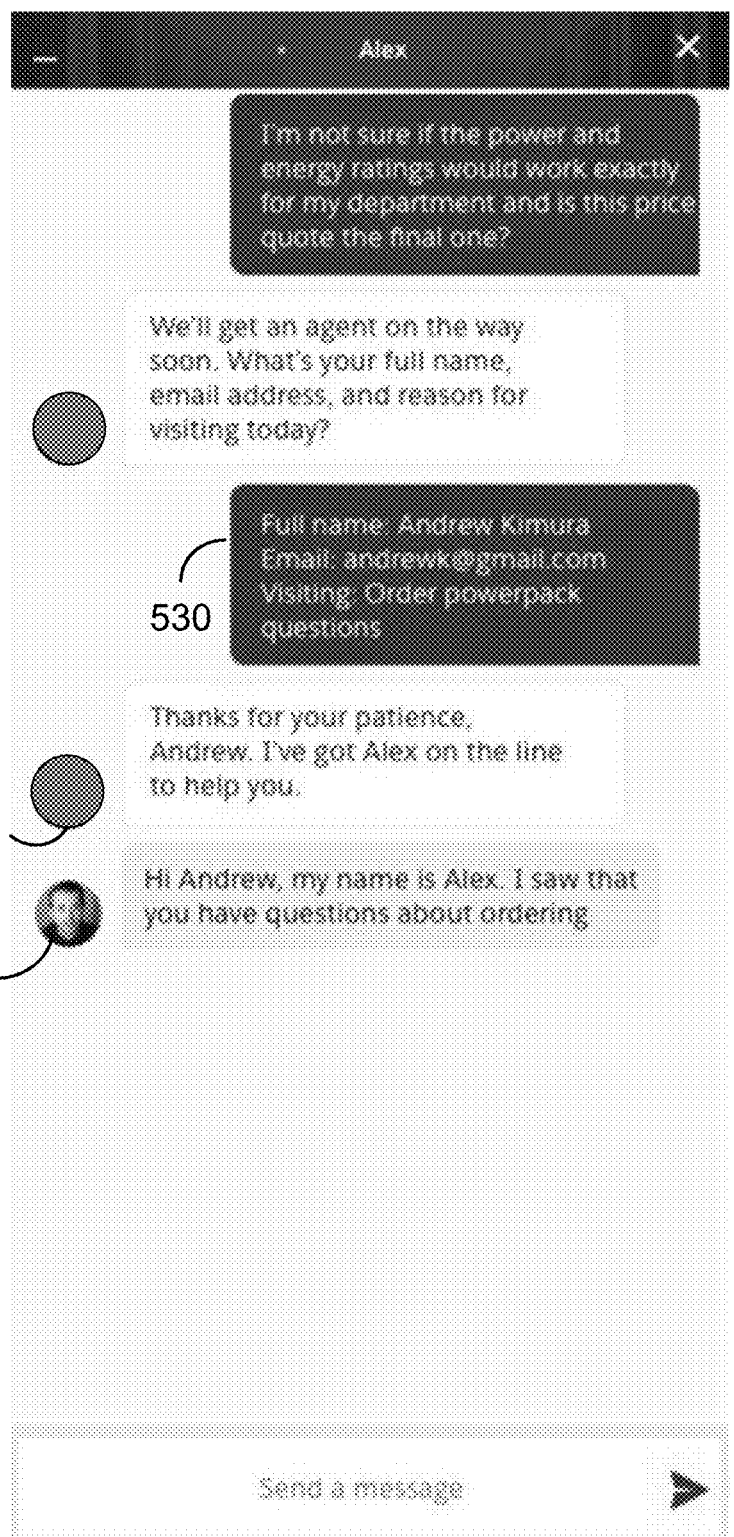
FIG. 5C is a continuation of the example of a conversation within an embedded self-help service for e-commerce applications, in accordance with some implementations.

FIG. 5C is a continuation of the example of a conversation within an embedded self-help service for e-commerce applications, in accordance with some implementations. Upon connecting the user with a live agent, the chat application module 514 is replaced with a chat message 530 displaying the information that the user submitted through the pre-chat form. Chat message 532 from the chat bot informs the user that a live agent Alex is currently connected within the conversational widget. Chat message 534 from live agent Alex says, "Hi Andrew, my name is Alex. I saw that you have questions about ordering." A chat bubble with Alex's live agent picture appears to signal that a live agent is speaking, rather than the chat bot.

Figure 5D:
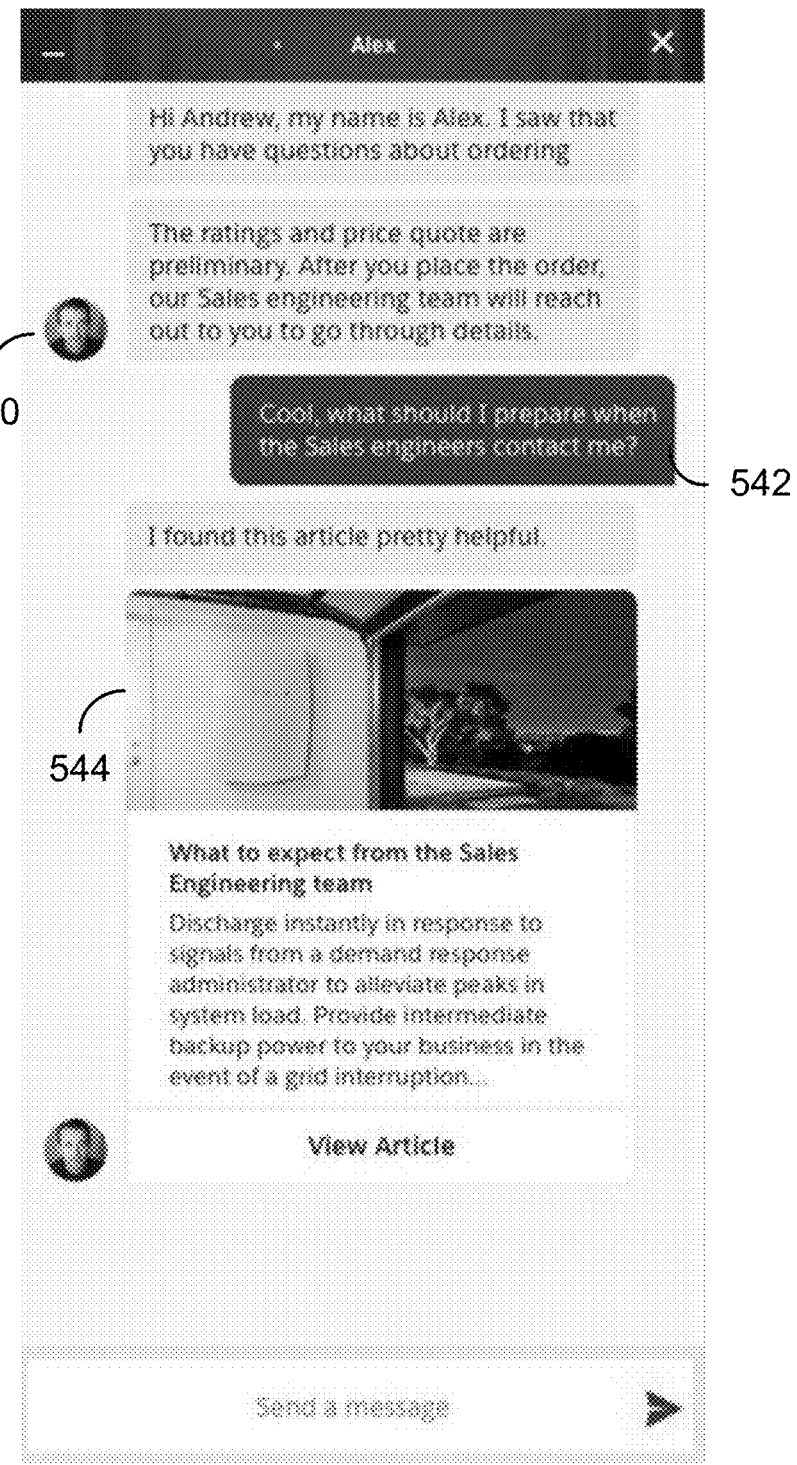
FIG. 5D is a continuation of the example of a conversation within an embedded self-help service for e-commerce applications, in accordance with some implementations.

FIG. 5D is a continuation of the example of a conversation within an embedded self-help service for e-commerce applications, in accordance with some implementations. Chat message 540 from the live agent further describes the process of ordering to the user. Chat message 542 from the user reads, "Cool, what should I prepare when the Sales engineers contact me?" The live agent understands this message to mean that the user would like further information regarding what to expect from the Sales Engineering team during the order process. The live agent then signals System 100 to move toward a "Knowledge Search" path in the interaction flow for a particular search and/or article within the knowledge base, and System 100 then launches a Knowledge Search application module 544 in response with that particular requested article. Knowledge Search application module 544 displays the article for the user to read and interact with, embedded directly within the conversational widget.

Figure 5E:
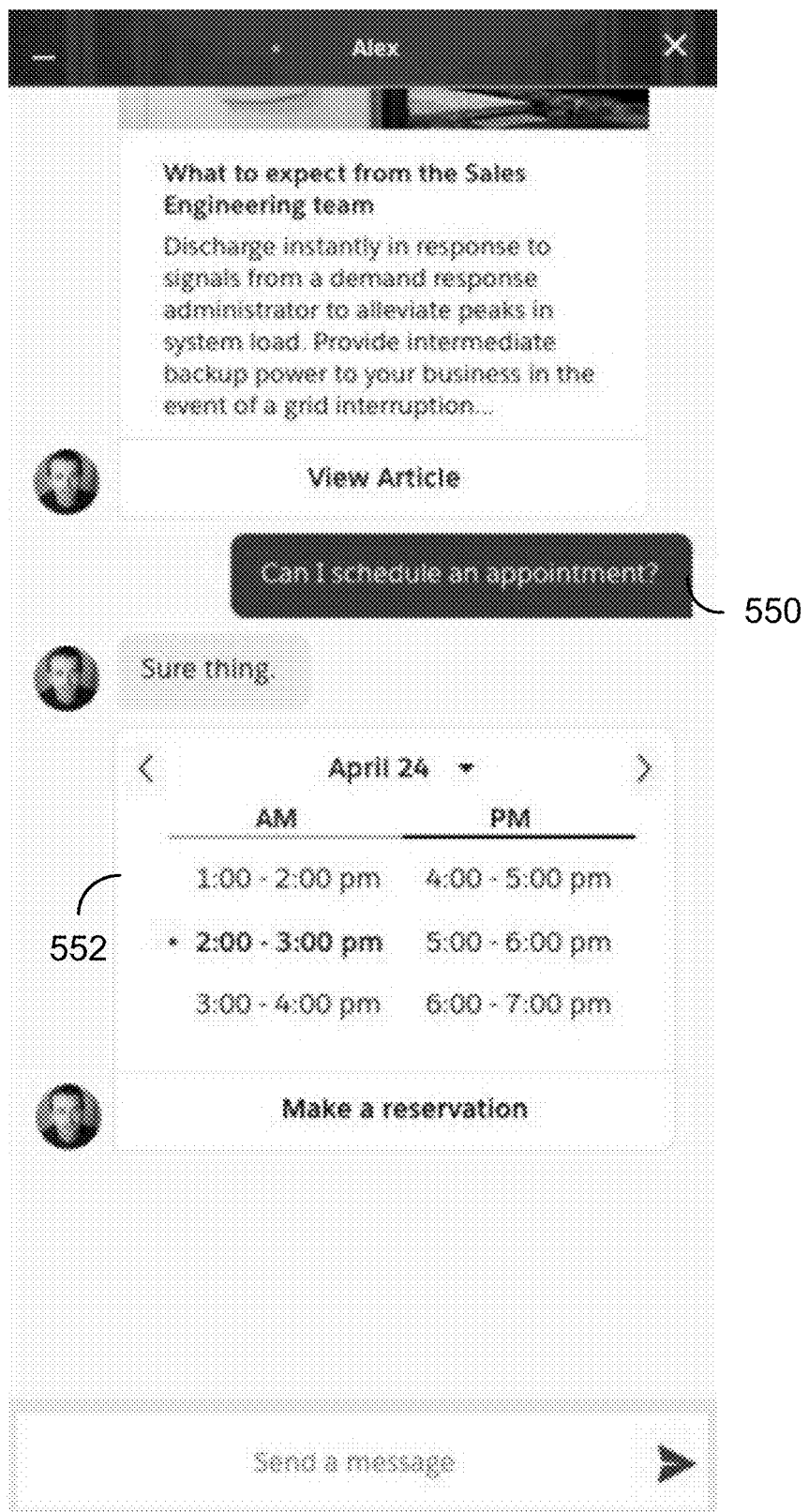
FIG. 5E is a continuation of the example of a conversation within an embedded self-help service for e-commerce applications, in accordance with some implementations.

FIG. 5E is a continuation of the example of a conversation within an embedded self-help service for e-commerce applications, in accordance with some implementations. Chat message 550 from the user is sent after the article is displayed within the conversational widget, and reads, "Can I schedule an appointment?" The live agent responds with, "Sure thing," and signals System 100 to launch an appointment scheduler application module 552. Within the appointment scheduler application module 552, the user may view and select different dates and time slots to schedule an appointment. The user may then click on a button labeled "Make a reservation" to submit a selected date and time.

Figure 5F:
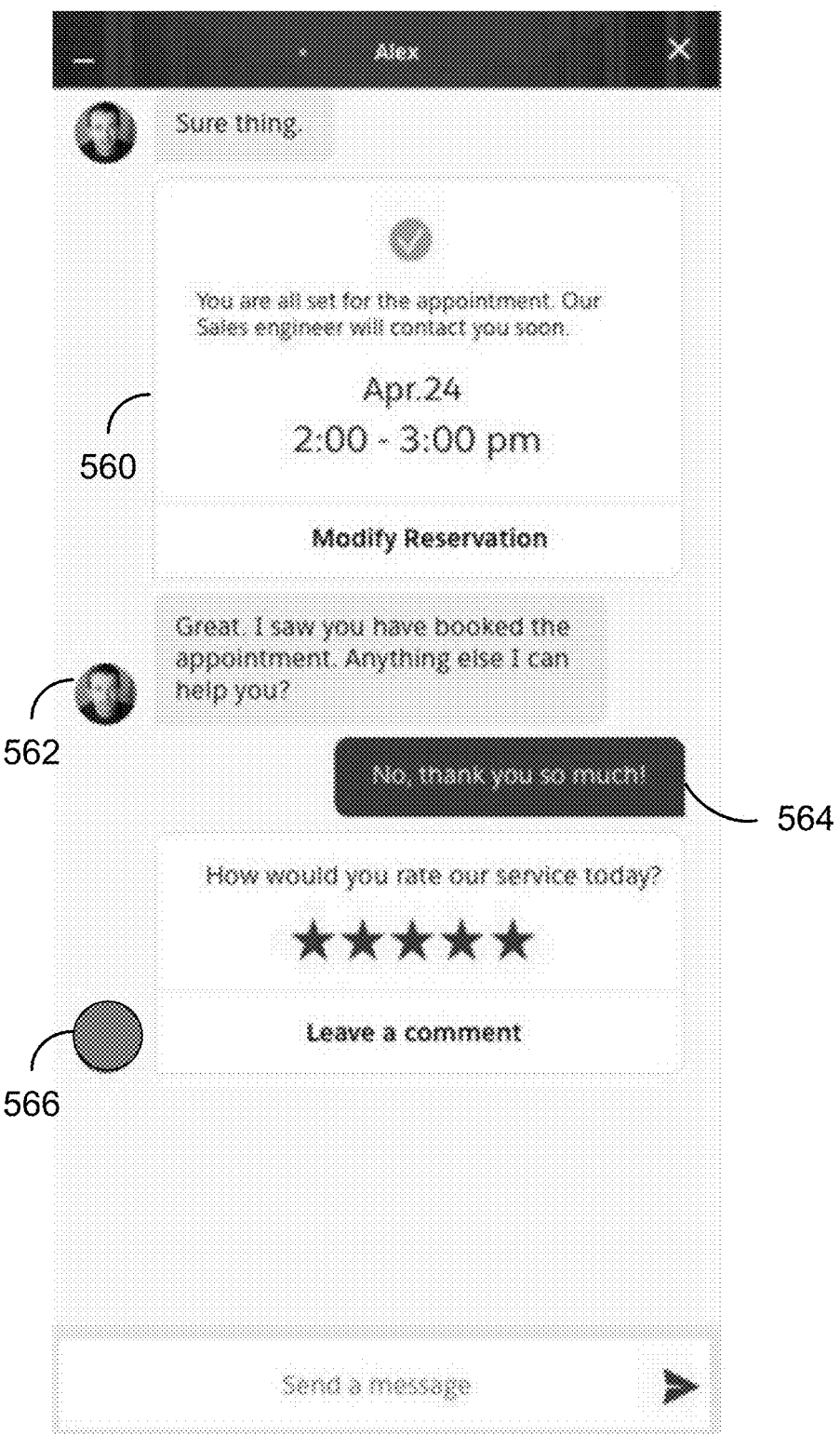
FIG. 5F is a continuation of the example of a conversation within an embedded self-help service for e-commerce applications, in accordance with some implementations.

FIG. 5F is a continuation of the example of a conversation within an embedded self-help service for e-commerce applications, in accordance with some implementations. The user submits a selected date and time of April 24 from 2:00 to 3:00 pm, and appointment scheduler application module 560 displays a message, "You are all set for the appointment. Our Sales engineer will contact you soon." The application module 560 also displays the selected date and time, and presents a button labeled "Modify Reservation" which allows a user to edit the selected date and time for the reservation, or cancel the reservation. A chat message from live agent Alex asks if there is anything else he can help the user with. Chat message 564 from the user reads, "No, thank you so much!" The live agent Alex then disconnects from the chat and signals to System 100 that the main bulk of the interaction flow is complete, and that the user is ready for a feedback and conclusion portion of the interaction flow as a final step. The automated chat bot responds by launching a service rating application module 566. The service rating application module 566 is embedded directly within the conversational widget, and displays the message, "How would you rate our service today?" The user is given the option to rate the self-help service from one to five stars, and is also given the option to leave a comment. The user rates the service five stars. The user is then free to close the conversational widget and continue with the rest of the e-commerce experience, returning back to the part of the experience the user was navigating through prior to the self-help service was requested. Alternatively, the user may opt to close out of the entire e-commerce experience.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
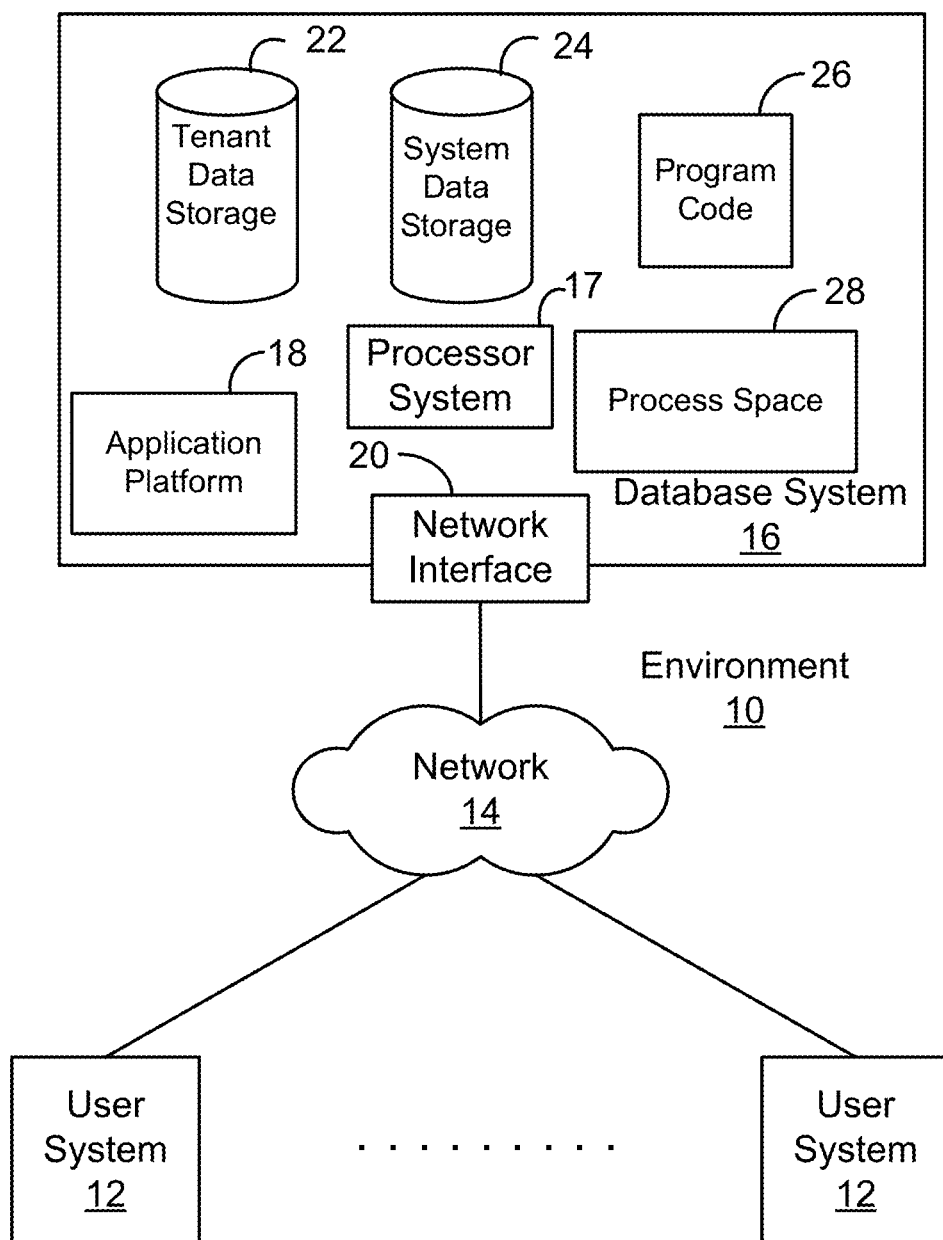
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
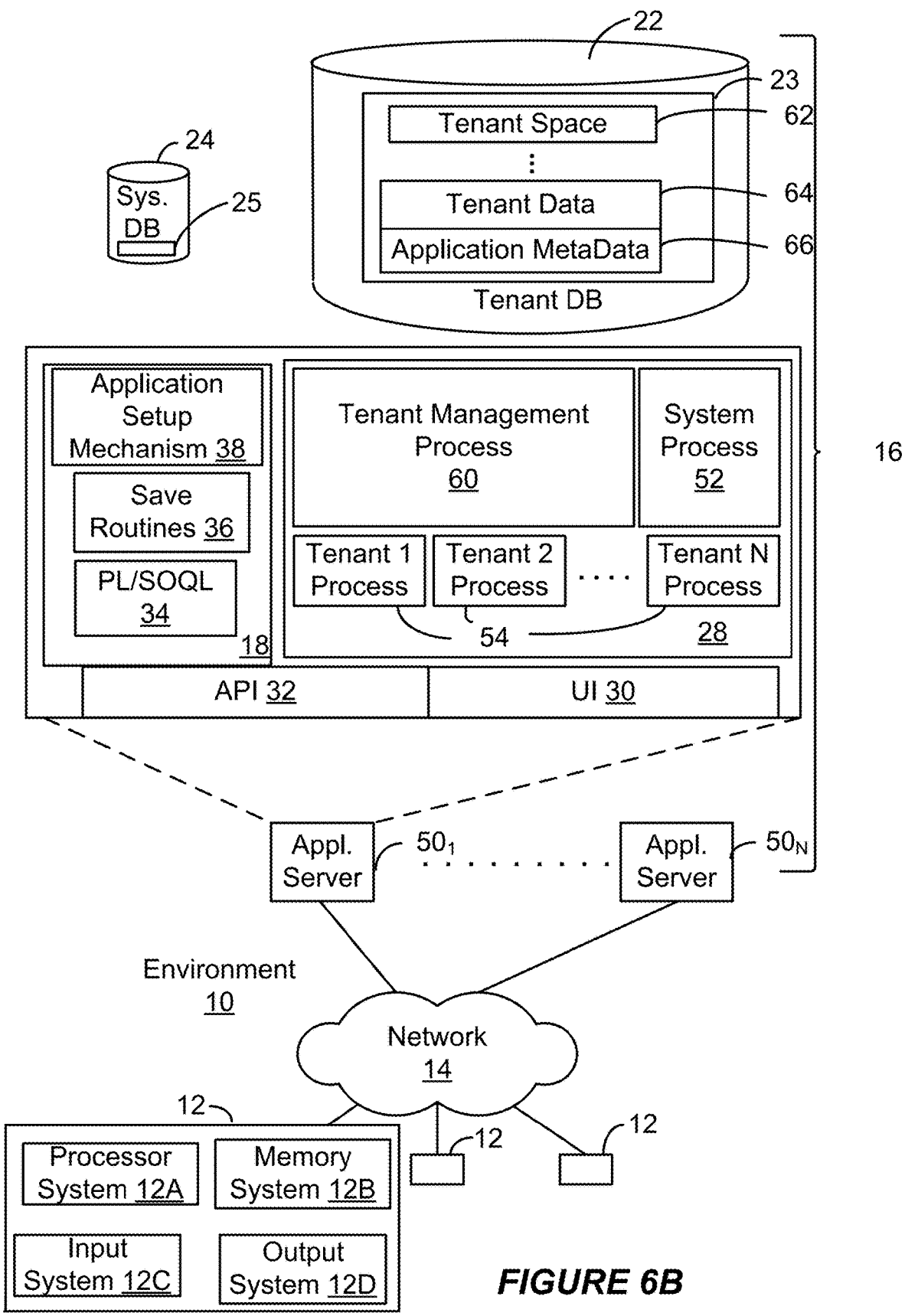
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
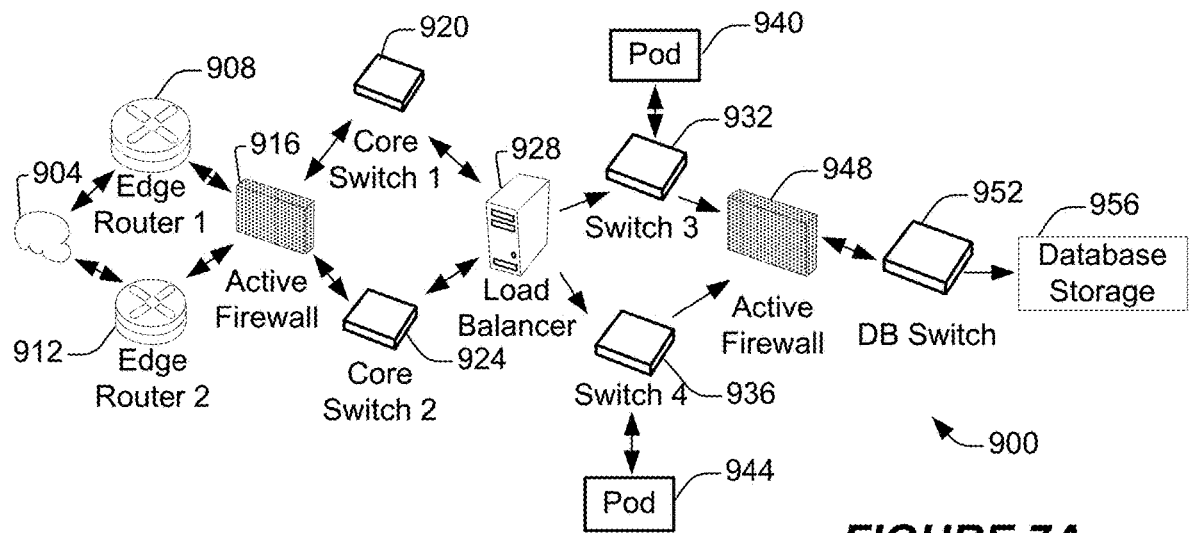
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
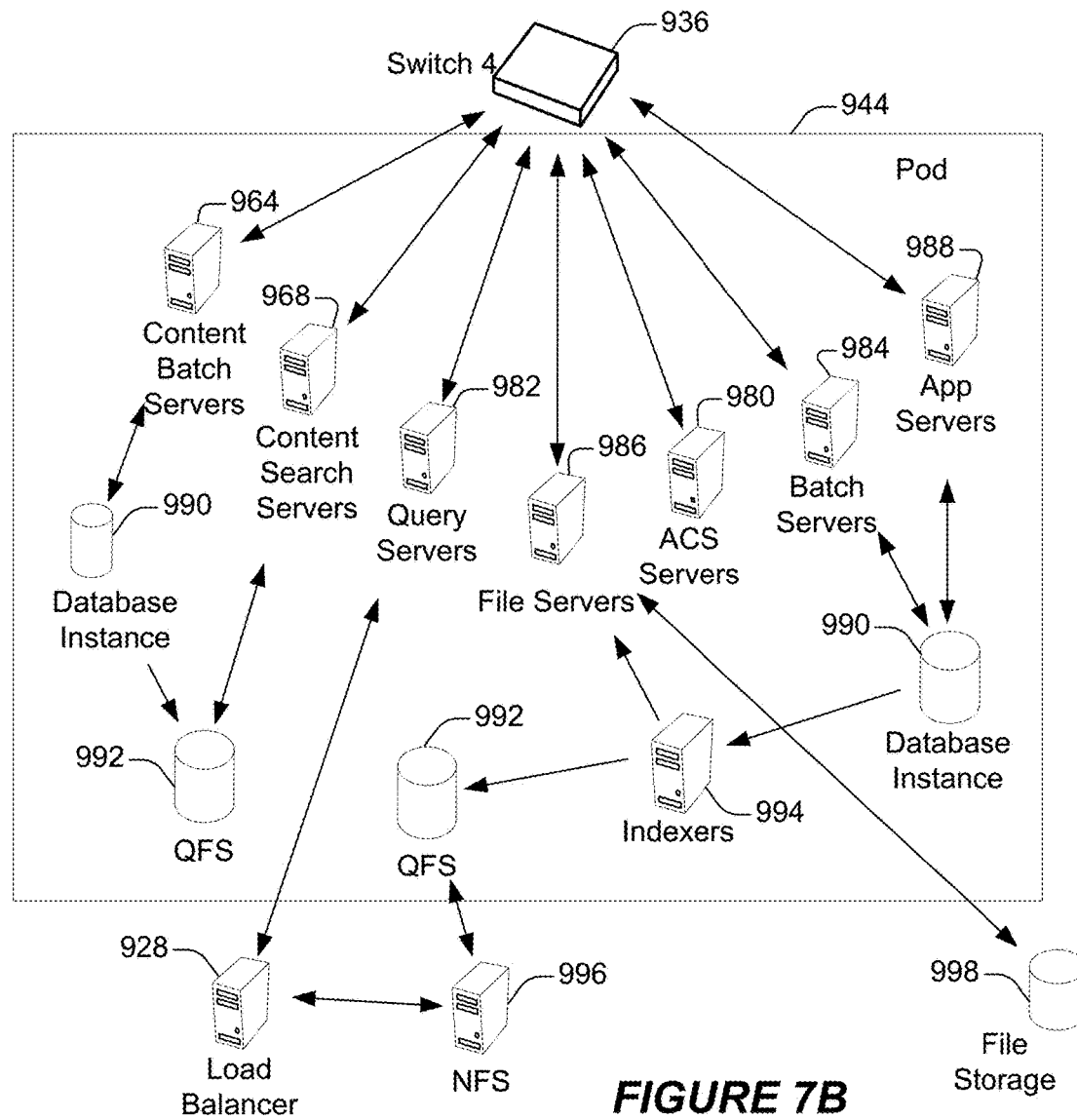
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system associated with a database storing enterprise records, the database system configurable to cause:
processing first input data received from a user device communicating with an e-commerce environment, the first input data indicating a user request for assistance from an e-commerce provider associated with the e-commerce environment;
providing a conversational widget for display on the user device, the conversational widget associated with the e-commerce environment;
processing second input data received from the user device in association with the conversational widget, the second input data providing further information regarding the user request for assistance from the e-commerce provider;
determining a first user intent in association with at least one or more of the enterprise records, the determining of the first user intent comprising:
obtaining a plurality of potential disambiguations of the second input data,
calculating one or more confidence weights for one or more of the potential disambiguations of the second input data,
selecting one of the potential disambiguations based on one or more characteristics of the second input data, the one or more characteristics based on the one or more confidence weights, the selected disambiguation characterizing the first user intent;
providing a first user-actionable application module associated with the determined first user intent for display on the user device, the first application module being embedded within the conversational widget;
processing third input data received from the user device;
determining a second user intent, the second user intent based on a disambiguation of the third input data; and
providing a second user-actionable application module associated with the determined second user intent for display on the user device, the second application module being embedded within the conversational widget.

2. The system of claim 1, the database system further configurable to cause:
determining an interaction flow for the conversational widget based on the determined first user intent, the interaction flow providing one or more application modules to be initiated, wherein the initiating an application module is performed in association with the interaction flow.

3. The system of claim 2, wherein the interaction flow is customized in part or in whole by the e-commerce provider.

4. The system of claim 1, wherein the first application module is one of: a knowledge base module to present one or more articles for display on the user device, an agent chat module to connect the user device to a live agent, an appointment scheduler module, a support ticket initiation module, a recommendation module, or a customer service rating module.

5. The system of claim 1, wherein the first application module is customized in part or in whole by an e-commerce provider within the e-commerce environment.

6. The system of claim 1, wherein the conversational widget is configurable such that one or more e-commerce item pages can be displayed simultaneously with the conversational widget.

7. The system of claim 1, wherein determining the first user intent is performed using natural language processing.

8. A method associated with a database storing enterprise records, the method comprising:
processing first input data received from a user device communicating with an e-commerce environment, the first input data indicating a user request for assistance from an e-commerce provider associated with the e-commerce environment;
providing a conversational widget for display on the user device, the conversational widget associated with the e-commerce environment;
processing second input data received from the user device in association with the conversational widget, the second input data providing further information regarding the user request for assistance from the e-commerce provider;

determining a first user intent in association with at least one or more of the enterprise records, the determining of the first user intent comprising:
- obtaining a plurality of potential disambiguations of the second input data,
- calculating one or more confidence weights for one or more of the potential disambiguations of the second input data,
- selecting one of the potential disambiguations based on one or more characteristics of the second input data, the one or more characteristics based on the one or more confidence weights, the selected disambiguation characterizing the first user intent;

providing a first user-actionable application module associated with the determined first user intent for display on the user device, the first application module being embedded within the conversational widget;

processing third input data received from the user device;

determining a second user intent, the second user intent based on a disambiguation of the third input data; and providing a second user-actionable application module associated with the determined second user intent for display on the user device, the second application module being embedded within the conversational widget.

9. The method of claim 8, further comprising:
determining an interaction flow for the conversational widget based on the determined first user intent, the interaction flow providing one or more application modules to be initiated, wherein the initiating an application module is performed in association with the interaction flow.

10. The method of claim 8, wherein the first application module is one of: a knowledge base module to present one or more articles for display on the user device, an agent chat module to connect the user device to a live agent, an appointment scheduler module, a support ticket initiation module, a recommendation module, or a customer service rating module.

11. The method of claim 8, wherein the first application module is customized in part or in whole by an e-commerce provider within the e-commerce environment.

12. The method of claim 8, wherein the conversational widget is configurable such that one or more e-commerce item pages can be displayed simultaneously with the conversational widget.

13. The method of claim 8, wherein determining the first user intent is performed using natural language processing.

14. A computer program product associated with a database storing enterprise records, the computer program product comprising computer-readable program code to be executed by one or more processors when retrieved from a non-transitory computer-readable medium, the program code comprising instructions configurable to cause:

processing first input data received from a user device communicating with an e-commerce environment, the first input data indicating a user request for assistance from an e-commerce provider associated with the e-commerce environment;

providing a conversational widget for display on the user device, the conversational widget associated with the e-commerce environment;

processing second input data received from the user device in association with the conversational widget, the second input data providing further information regarding the user request for assistance from the e-commerce provider;

determining a first user intent in association with at least one or more of the enterprise records, the determining of the first user intent comprising:
- obtaining a plurality of potential disambiguations of the second input data,
- calculating one or more confidence weights for one or more of the potential disambiguations of the second input data,
- selecting one of the potential disambiguations based on one or more characteristics of the second input data, the one or more characteristics based on the one or more confidence weights, the selected disambiguation characterizing the first user intent;

providing a first user-actionable application module associated with the determined first user intent for display on the user device, the first application module being embedded within the conversational widget;

processing third input data received from the user device;

determining a second user intent, the second user intent based on a disambiguation of the third input data; and providing a second user-actionable application module associated with the determined second user intent for display on the user device, the second application module being embedded within the conversational widget.

15. The computer program product of claim 14, the instructions further configurable to cause:
determining an interaction flow for the conversational widget based on the determined first user intent, the interaction flow providing one or more application modules to be initiated, wherein the initiating an application module is performed in association with the interaction flow.

16. The computer program product of claim 15, wherein the interaction flow is customized in part or in whole by the e-commerce provider.

17. The computer program product of claim 14, wherein the first application module is customized in part or in whole by an e-commerce provider within the e-commerce environment.

18. The computer program product of claim 14, wherein the first application module is one of: a knowledge base module to present one or more articles for display on the user device, an agent chat module to connect the user device to a live agent, an appointment scheduler module, a support ticket initiation module, a recommendation module, or a customer service rating module.

19. The computer program product of claim 14, wherein the conversational widget is configurable such that one or more e-commerce item pages can be displayed simultaneously with the conversational widget.

20. The computer program product of claim 14, wherein determining the first user intent is performed using natural language processing.

* * * * *